Figure 1:
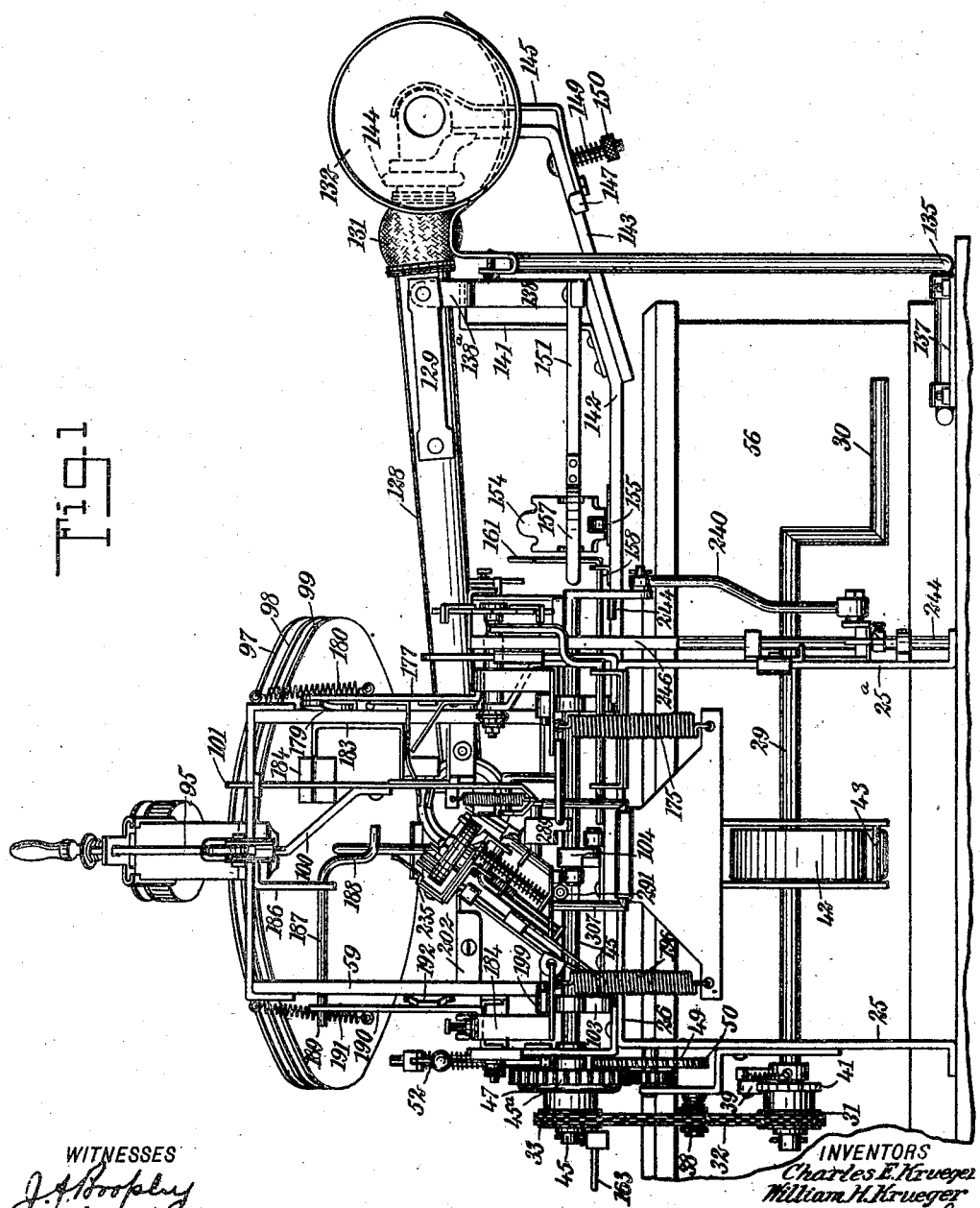

C. E. & W. H. KRUEGER.
MAGAZINE TALKING MACHINE.
APPLICATION FILED JAN. 11, 1908.

915,448.

Patented Mar. 16, 1909.
12 SHEETS—SHEET 1.

WITNESSES

INVENTORS
Charles E. Krueger
William H. Krueger
BY Munn & Co.
ATTORNEYS

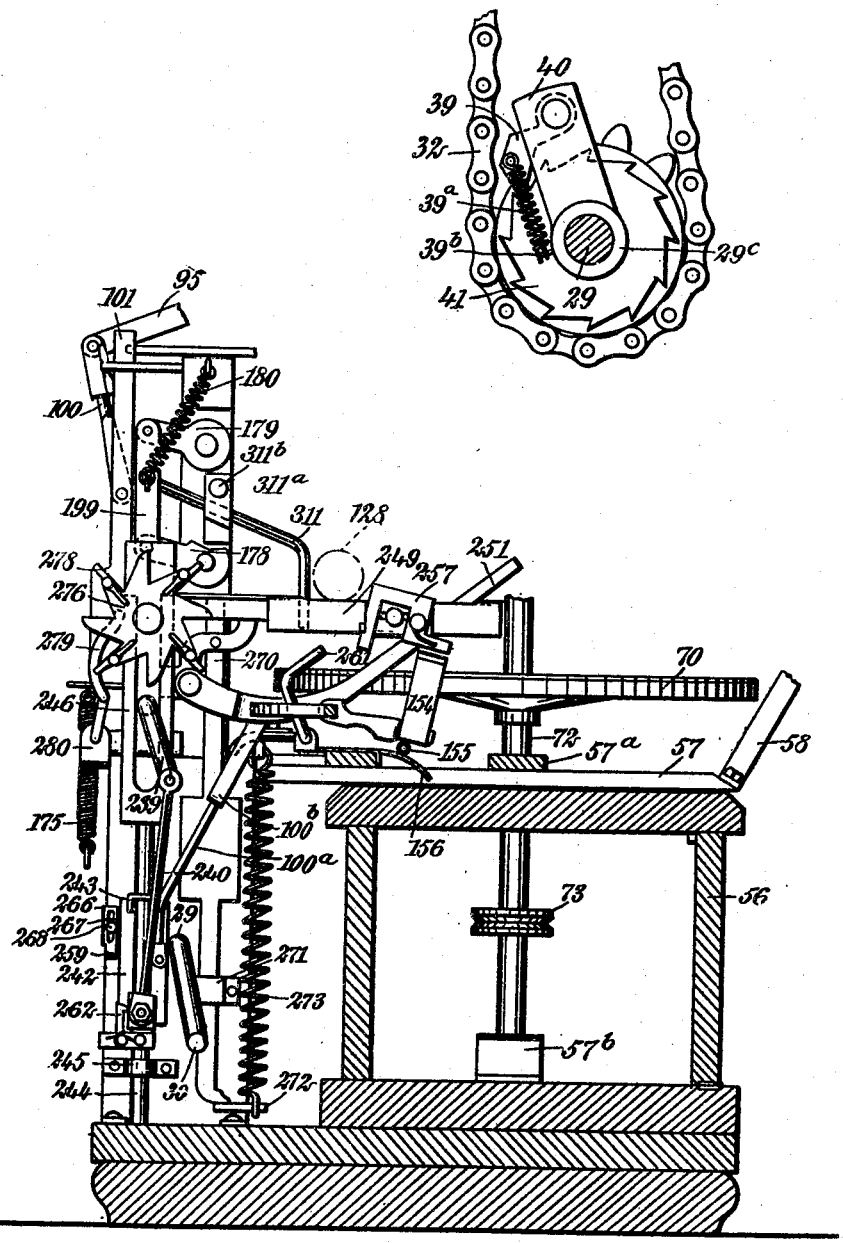

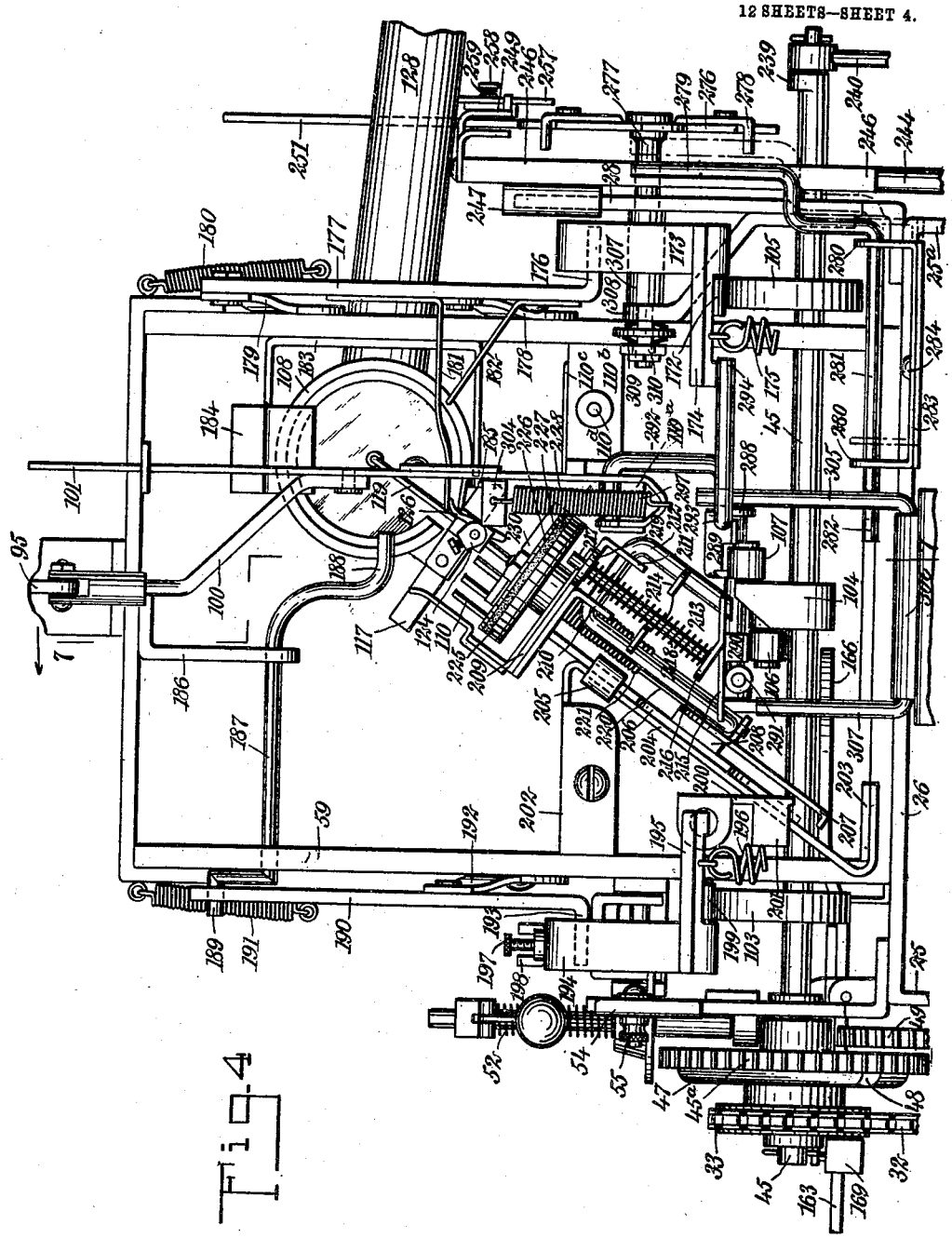

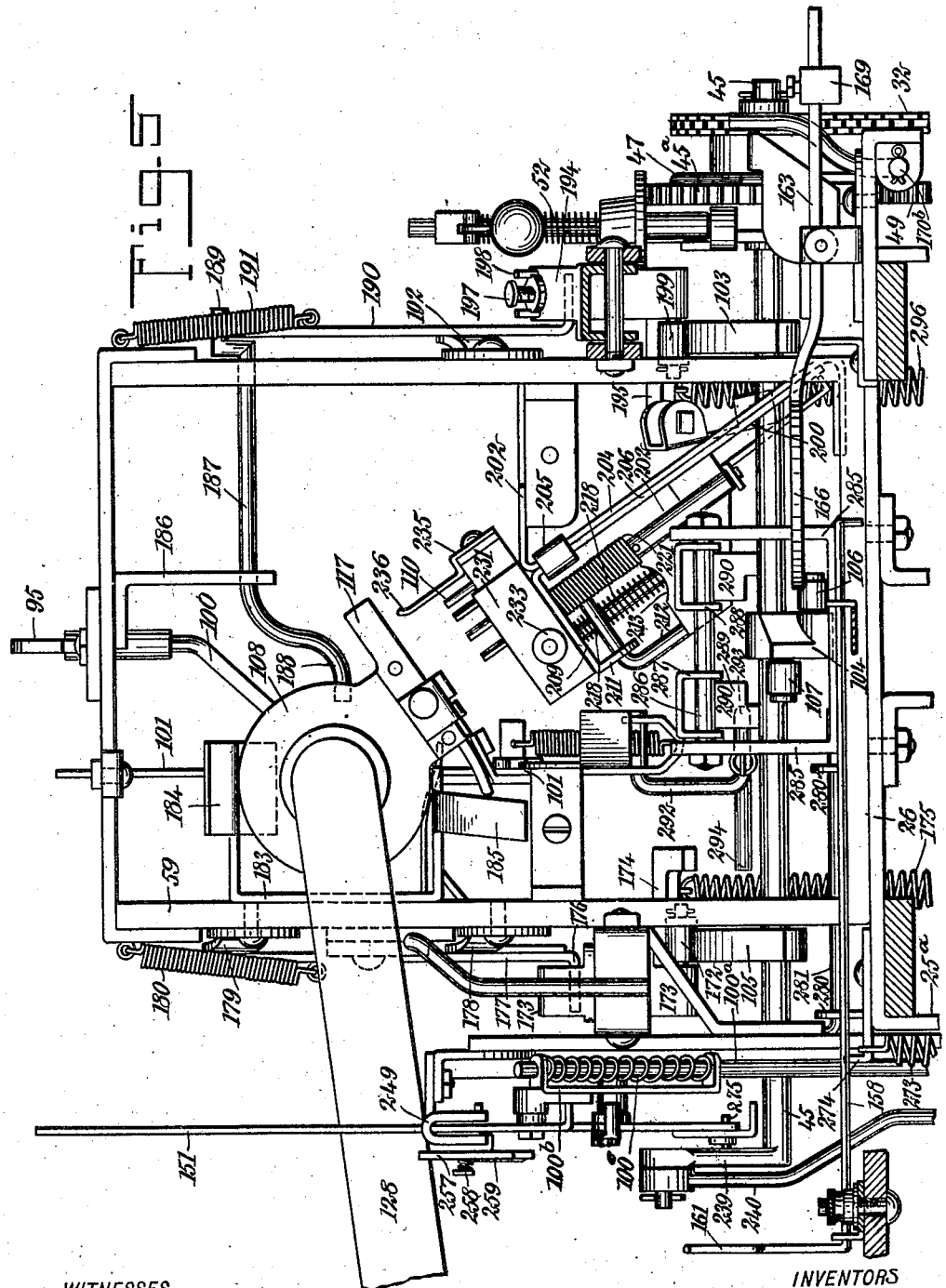

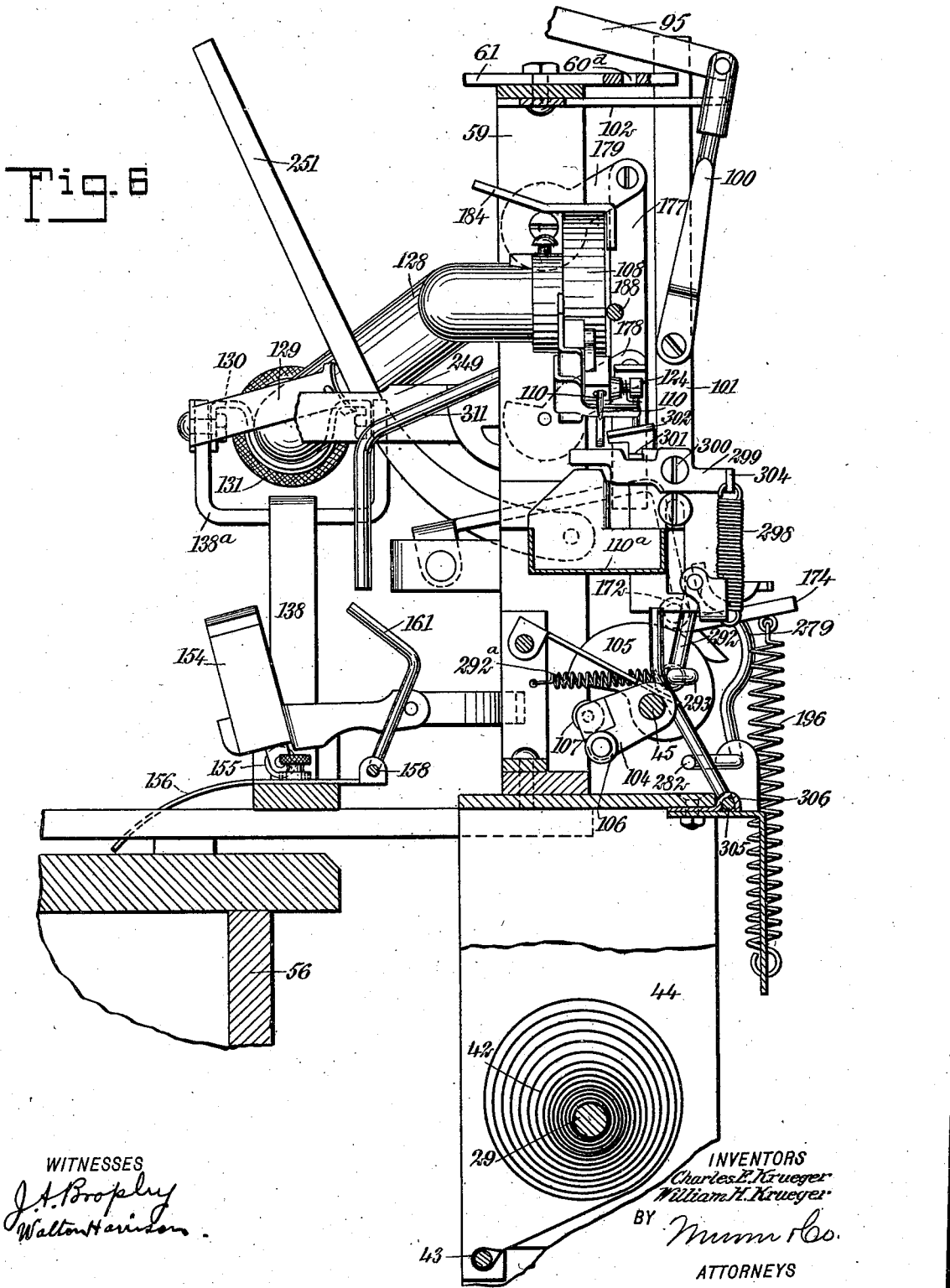

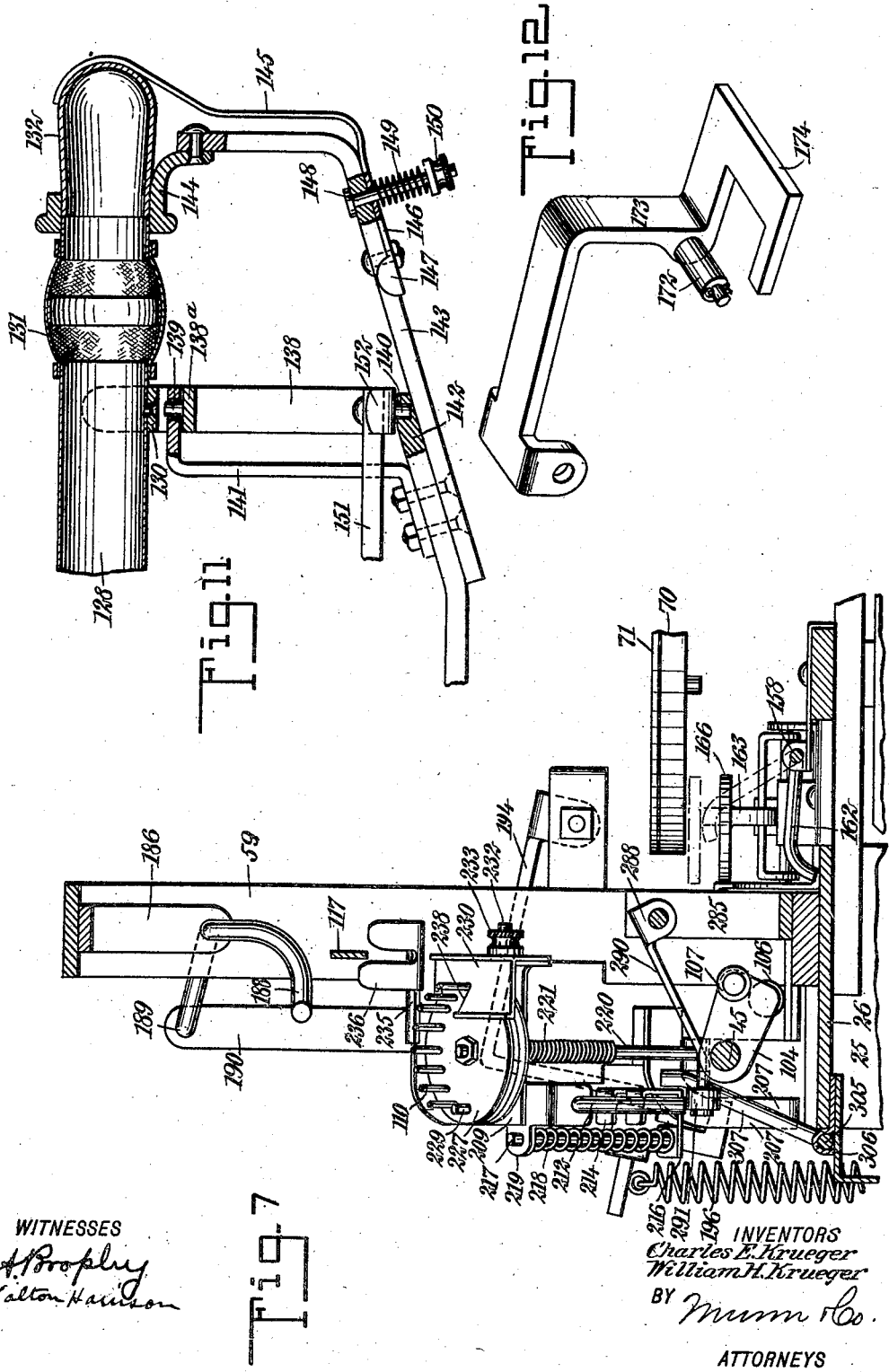

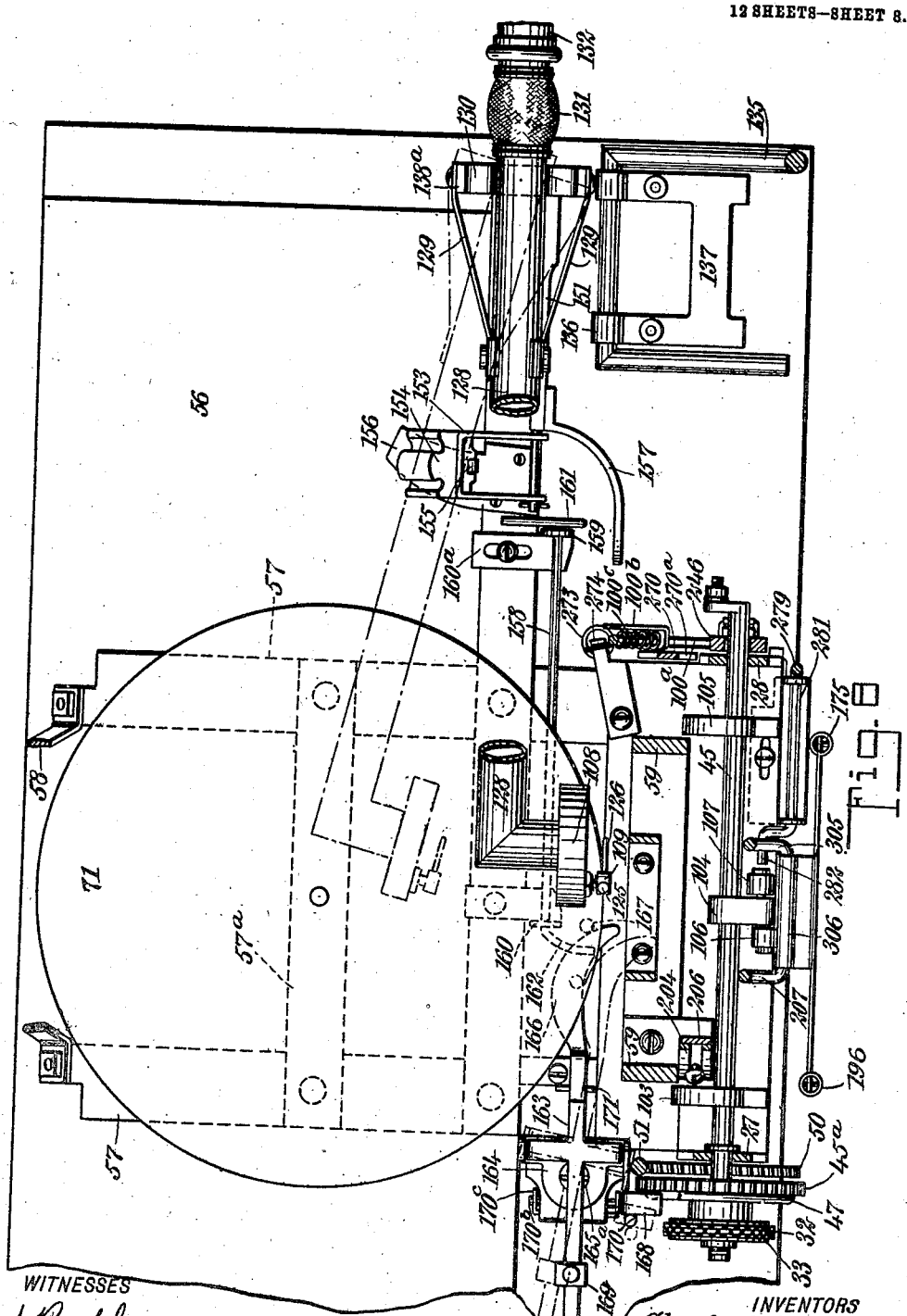

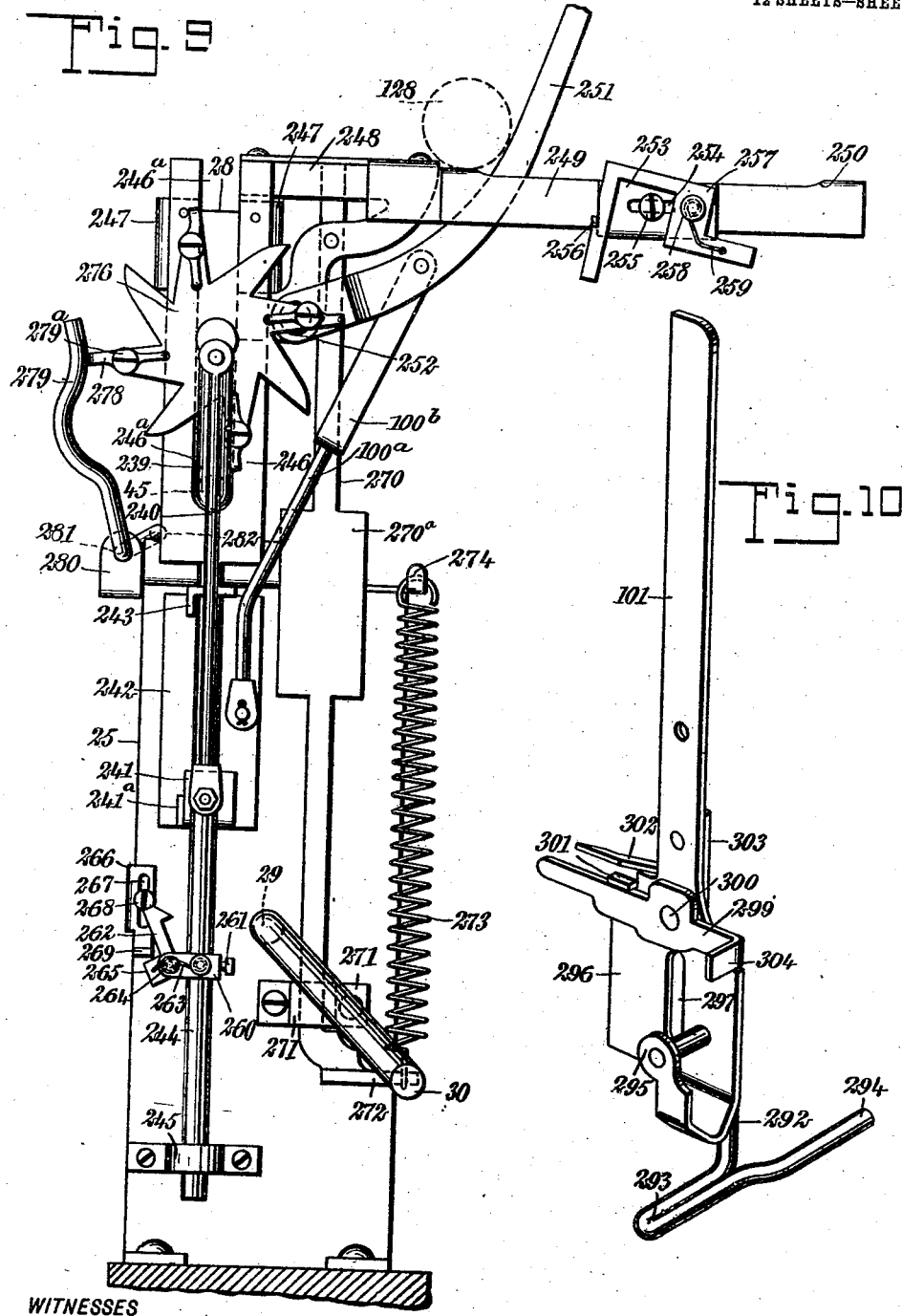

C. E. & W. H. KRUEGER.
MAGAZINE TALKING MACHINE.
APPLICATION FILED JAN. 11, 1908.
915,448.
Patented Mar. 16, 1909.
12 SHEETS—SHEET 10.
Fig. 13.
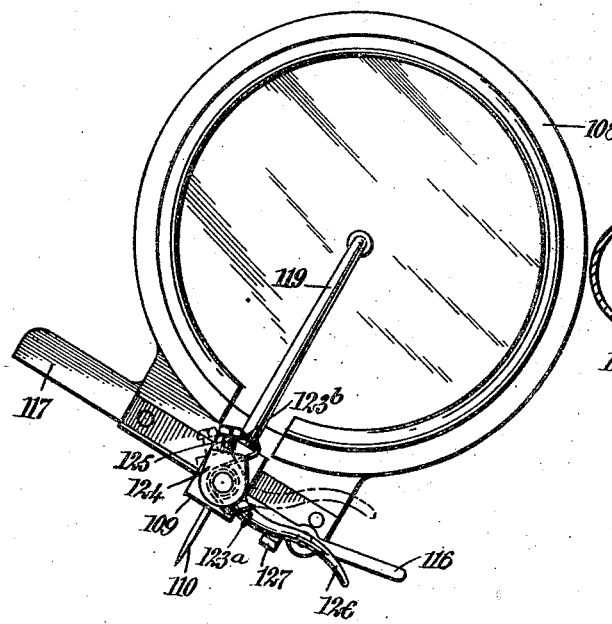
Fig. 14.
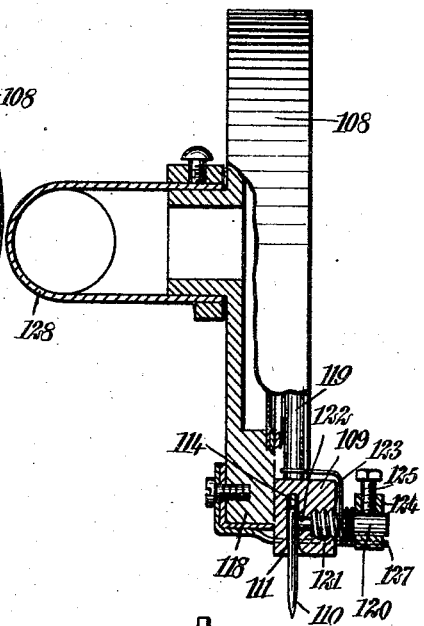
Fig. 15.
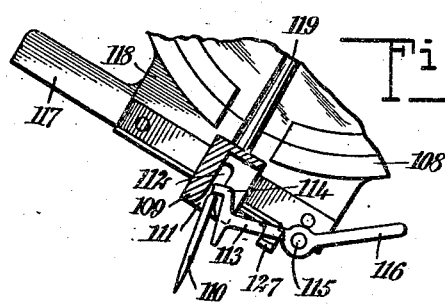
Fig. 16.
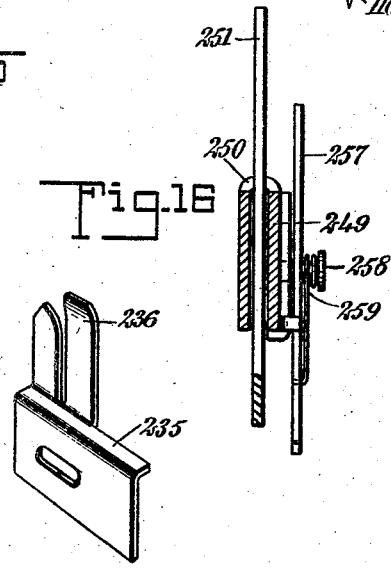
Fig. 22.
Fig. 23.
WITNESSES
J. A. Brophy
Walton Harrison
INVENTORS
Charles E. Krueger
William H. Krueger
BY Munn & Co.
ATTORNEYS

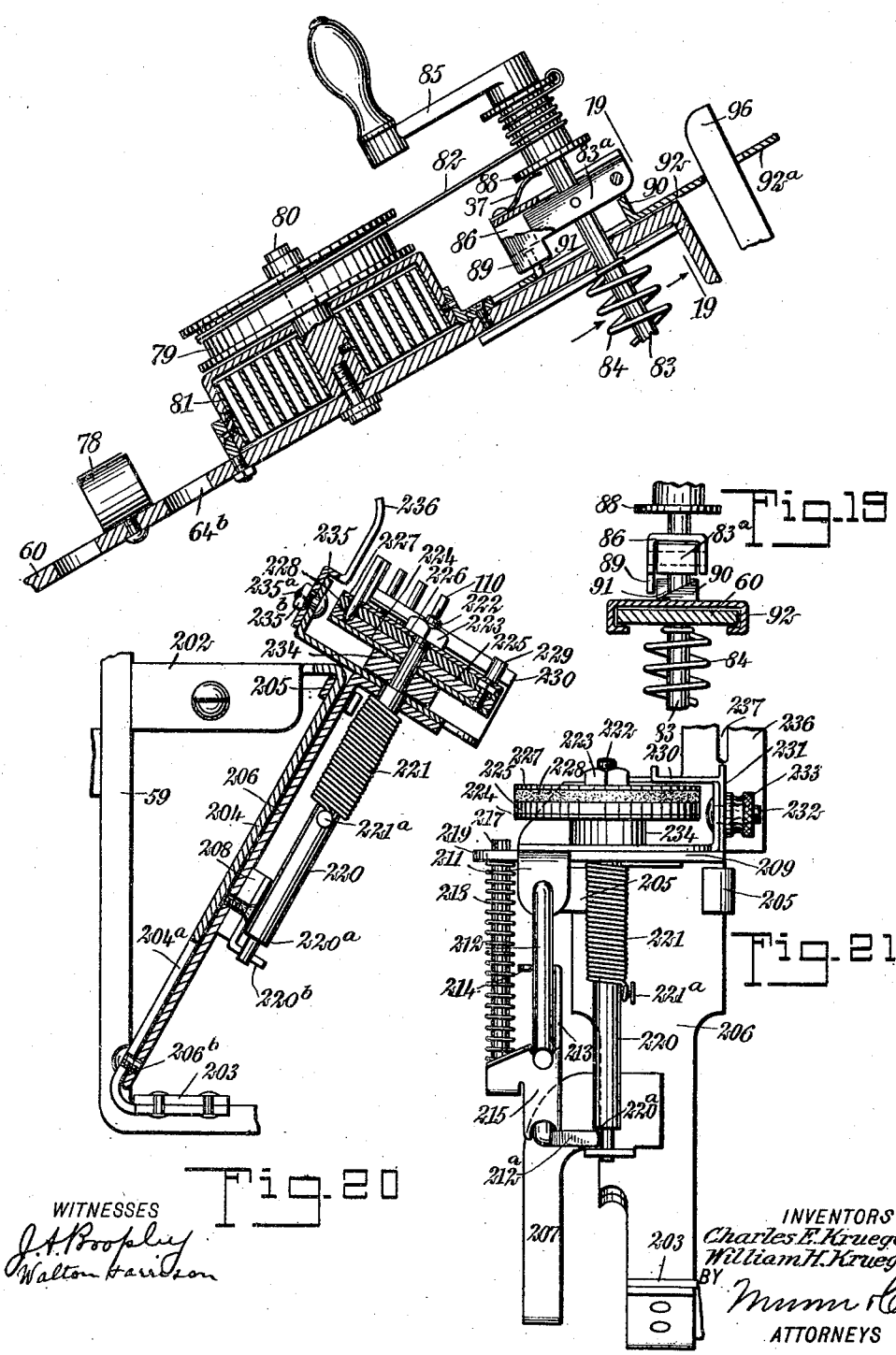

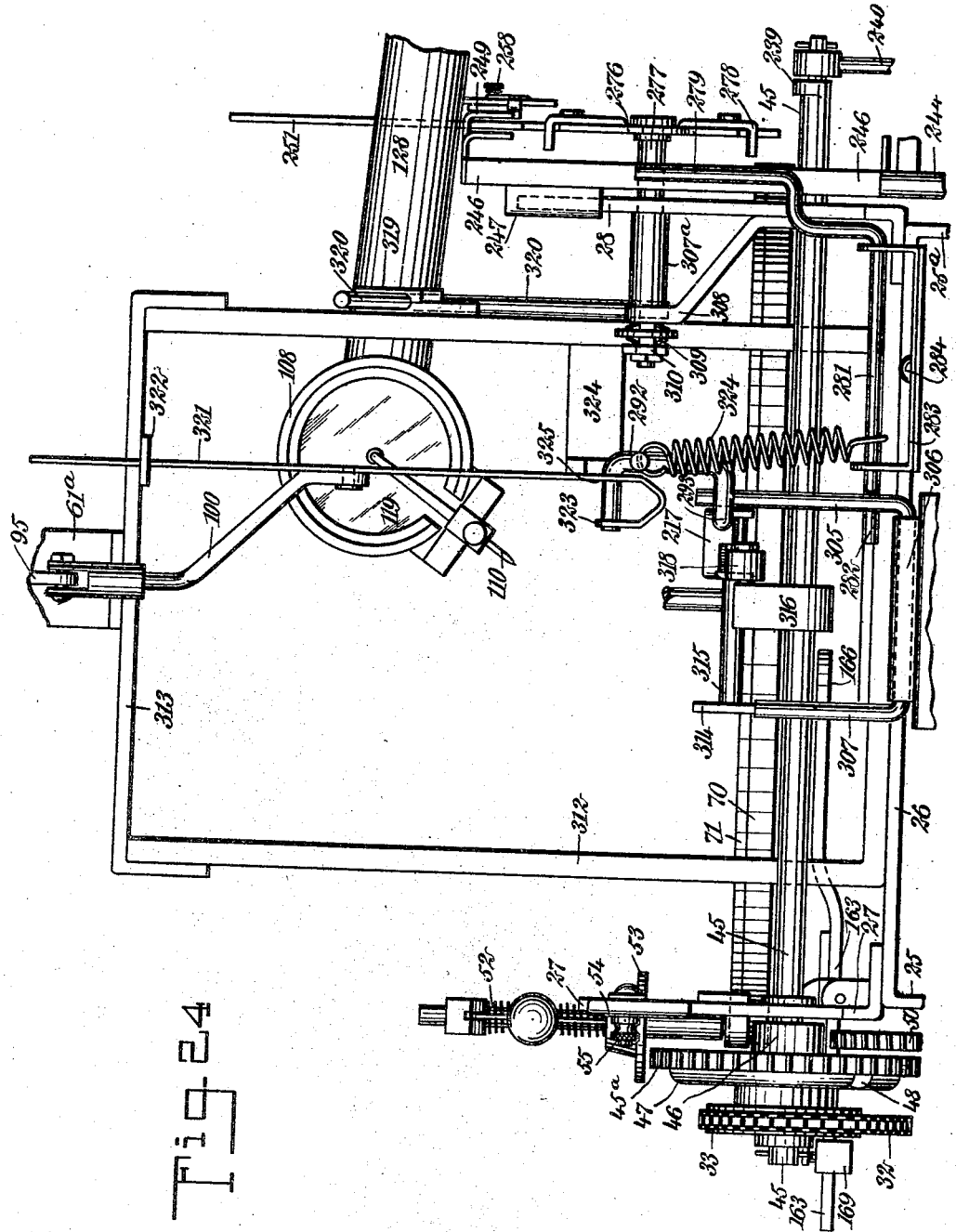

UNITED STATES PATENT OFFICE.

CHARLES E. KRUEGER AND WILLIAM H. KRUEGER, OF MINNEAPOLIS, MINNESOTA.

MAGAZINE TALKING-MACHINE.

No. 915,448.  Specification of Letters Patent.  Patented March 16, 1909.

Application filed January 11, 1908. Serial No. 410,383.

*To all whom it may concern:*

Be it known that we, CHARLES E. KRUEGER and WILLIAM H. KRUEGER, both citizens of the United States, and residents of Minneapolis, in the county of Hennepin and State of Minnesota, have invented a new and Improved Magazine Talking-Machine, of which the following is a full, clear, and exact description.
Our invention relates to talking machines, our purpose being to produce a device in which a large number of distinct operations are performed automatically, so that the machine requires a minimum of attention.
To this end our invention embodies the following objects: I. To provide a magazine for holding a number of separate records and means for changing these records so that they are played in a predetermined order of succession, the substitution of one record for another being made automatically by the machine. II. To provide mechanism whereby a needle, when used upon one record may be discarded and a new needle substituted for use upon the next successive record, the substitution of this needle being performed automatically by the machine. III. To enable the operator, by an adjustment of certain parts of the machine, to change the action thereof so that each record may be played twice in succession before the substitution of another record, and each needle may be used twice before the substitution of another needle. IV. To enable certain parts to be disengaged from the main apparatus, thereby enabling any record or records to be repeated as many times as desired, new needles being substituted automatically for those already used. V. To enable the magazine of the machine to be adjusted so as to accommodate large or small records as desired. VI. To enable certain parts of the machine to be thrown out of action at will so that the records may be changed automatically, a single needle being used to operate upon all of the records in succession.

Reference is to be had to the accompanying drawings forming a part of this specification, in which similar characters of reference indicate corresponding parts in all the figures.

Figure 2:
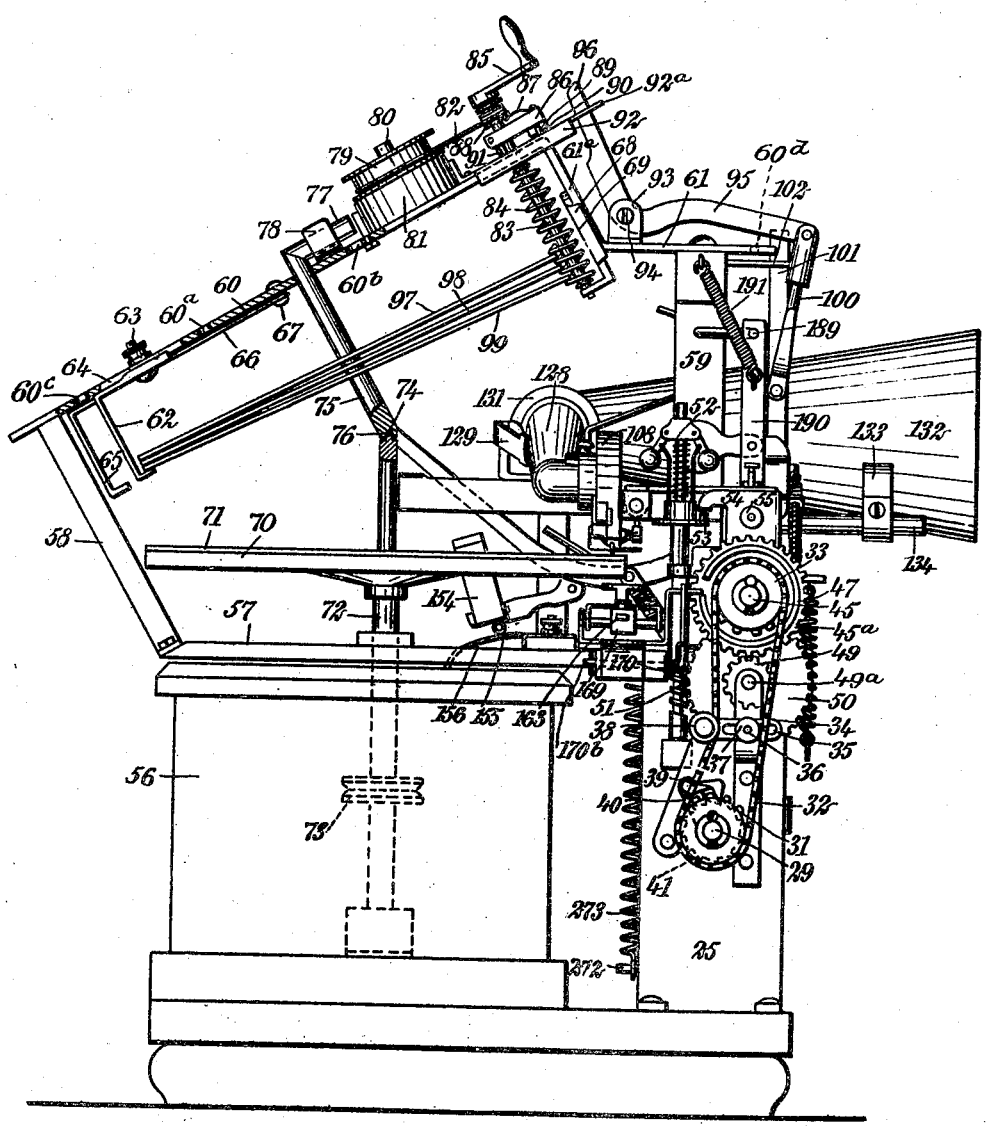

Figure 1 is a front elevation of the talking machine, this view showing at the right the phonographic horn, at its top a number of disk records to be dropped one at a time upon the turntable, and showing at its middle and bottom portions the gearing and various parts operated thereby. Fig. 2 is a side elevation, parts being broken away, this view showing more particularly the manner in which the several records are temporarily supported and how they are dropped one at a time upon the turntable. Fig. 3 is a fragmentary section through the casing showing the turntable and various moving parts not connected directly with the turntable, and also showing a star-wheel and its connections for periodically throwing certain parts out of action when arranged by the operator to do so; Fig. 4 is a fragmentary front elevation of the machine showing particularly the needle wheel serving as a magazine for holding the needles, this view further showing the various parts for moving the needle wheel bodily toward the needle holder, and still further showing the various parts used for causing the ejection of a needle already used and the automatic substitution therefor of a new needle. Fig. 5 is a fragmentary rear elevation, certain portions appearing in section, this view showing substantially the same portion of the mechanism as that disclosed in Fig. 4; Fig. 6 is a substantially central vertical section through the machine showing the sound box, the receptacle for holding the needles when ejected, and the various parts used for causing the ejection of the needles when used and the substitution therefor of new needles; Fig. 7 is a fragmentary section upon the line 7—7 of Fig. 4, looking in the direction of the arrow and showing the needle wheel and the accompanying parts whereby it is actuated; Fig. 8 is a plan view of the central portion of the apparatus, indicating in full and dotted lines various movements of the tube, this view further showing the mechanism whereby, upon the completion of a record, various automatic devices are thrown into action for the purpose of substituting the next record and changing the needle; Fig. 9 is a side elevation showing the star-wheel as the same would appear to an observer located at the right of Fig. 1, and further showing the movable rest for supporting the phonographic tube, and showing also the movable arm for shifting this tube in a lateral direction; Fig. 10 is a perspective of a slide upon which is mounted one of the levers used for extracting the old needle used in opening and closing the needle holder for the purpose of changing the needles; Fig. 11 is a fragmentary section through a portion of the phonograph horn and the phonograph tube, this view showing a flexible connection for these parts, and further showing various adjustments for the horn; Fig. 12 is a perspective of one of the cam levers and its shelf used for actuating the needle holder; Fig. 13 is an enlarged front elevation of the sound box and needle holder; Fig. 14 is an enlarged fragmentary section through the sound box and needle holder; Fig. 15 is an enlarged fragmentary section through a portion of the needle holder, this view showing the ejector for throwing out a needle after it has been used; Fig. 16 is an enlarged fragmentary section through a portion of the guide used for guiding the sound box into a predetermined position; Fig. 17 is a fragmentary section showing the ratchets mounted upon the main shaft for enabling the latter to be turned in order to wind up the main spring; Fig. 18 is an enlarged central section through the winding barrel and drum used for releasing the records one at a time, so as to drop them upon the turntable; Fig. 19 is a fragmentary section upon the line 19—19 of Fig. 18, looking in the direction of the arrow, and showing the escapement whereby movements of the magazine mechanism are checked periodically in order to prevent dropping of more than one record at a time; Fig. 20 is a central section through the needle wheel and its mountings showing how the needles are stored within the wheel; Fig. 21 is an enlarged elevation of the needle wheel and other parts shown in Fig. 20; Fig. 22 is a perspective of the needle guide, this part coacting with the needle wheel for the purpose of stopping the needle wheel in such position that each needle arrives at exactly the same point in order to be more readily grasped by the needle holder; Fig. 23 is a perspective of the guide used for directing the bodily movements of the needle wheel and its accompanying parts relatively to the needle holder; Fig. 24 is a front elevation showing the device as provided with a different form of auxiliary frame, and as discarding certain parts so as to enable the machine to be used without the automatic change of needles after each record is played.

Standards 25, 25$^a$ having a plate 26 integral therewith together constitute the main frame. Standards 27, 28 are mounted upon the main frame and project upwardly therefrom. The main shaft is shown at 29 and is provided with a handle 30 whereby it may be turned. Mounted rigidly upon the main shaft 29 is a sprocket gear 31 and engaging this sprocket gear is a sprocket chain 32. A sprocket gear 33 likewise engages the chain 32. A bracket 34 (see Fig. 2) is provided with a slot 35, and extending through the slot is a screw 36 engaged by a nut 37. By loosening the nut 37 by hand, the bracket may be adjusted by moving it to the right or to the left according to Fig. 2, and when the adjustment is complete the nut 37 may be tightened. An idle sprocket gear 38 is revolubly mounted upon the bracket 34 and engages the sprocket chain 32. Our purpose in rendering the bracket 34 adjustable is to regulate the tension of the sprocket chain. Just below the idle sprocket gear 38 is a pawl 39 mounted upon a crank 40, the latter being rigid upon the main shaft 29. A spiral spring 39$^a$ extends from this pawl to a pin 39$^b$, mounted upon the crank collar 39$^c$, see Fig. 17. A ratchet wheel 41 is likewise mounted rigidly upon the main shaft and is engaged by the pawl 39. The pawl is to prevent backward turning of the main shaft 29.

A main spring (see Fig. 6) is shown at 42 and is connected at one of its ends with a stationary pin 43, its other end being secured to the main shaft 29. This pin is mounted within a casing 44 which protects the spring. Whenever the main shaft 29 is turned by aid of the hand crank 30, the main spring 42 is wound up, and the main shaft 29 is unable to turn backward for the reasons above stated. A revoluble shaft 45 is provided with a gear 45$^a$ having a hub 46 and being rigid relatively to the shaft. Mounted rigidly upon the gear 45$^a$ is a cam 47 provided with a notch 48. This cam, except for the notch 48, is annular in shape. Disposed below the wheel 45$^a$ and meshing therewith is a pinion 49 mounted rigidly upon a stub shaft 49$^a$. A worm gear 50 is also mounted rigidly upon this stub shaft. This worm gear engages a revoluble worm 51 forming a part of a governor 52. This governor is provided with a friction disk 53 and with a shoe 54 secured in position by aid of a screw 55. By aid of the screw 55 the shoe 54 may be adjusted, within reasonable limits, to any desired elevation upon the standard 27, the governor being thus set for different speeds. Hence, by adjusting the shoe 54 the speed of the entire apparatus may be controlled at will.

A wooden casing is shown at 56 and supported upon it are two bars 57, and across them extends a bar 57$^a$. Extending obliquely upward from the bars 57, is a brace 58. Opposite this brace and mounted upon the main frame is an upper frame 59. A flat bar 60 is secured to the brace 58 and is provided with bent portions 61, 61$^a$, the portion 61 being secured upon the top of the upper frame 59. Mounted upon the under side of the bar 60 is a supporting bracket 62 held in position by a screw 63 which passes through a slot 64. The bracket 62 is adjustable relatively to the bar 60 by aid of this slot and screw. Another bracket 65 is disposed upon the under side of the bar 60 and is provided with a body portion 66 held against the bar by aid of a bolt 67. The bar 60 is provided with holes 60$^a$, 60$^b$ for the purpose of making certain adjustments hereinafter described. Mounted upon the bent portion 61ª of the bar 60 is a bracket 68 held in position by a clamping bolt 69. This bracket 68 serves as a bearing, as will appear below. A turntable is shown at 70 and is provided with the usual felt surface 71 for supporting the record disks. This turntable is mounted upon a shaft 72 which extends directly upward through the turntable and which is journaled upon the bar 57ª and a bearing 57ᵇ. Mounted upon this shaft is a pulley 73 whereby it and the turntable are rotated continuously. The upper end of the shaft 72 is provided with a boss 74 which is engaged by a rod 75. The lower end 76 of this rod is so shaped as to fit over the boss 74, as will be understood from Fig. 2. The rod 75 is provided with a portion 77 which is engaged by a clip 78 so as to hold the parts in position. By grasping the rod 75 it may be extricated from the clip 78 and moved upwardly, or, if need be, entirely removed from the machine in order to facilitate the removal and replacement of the record disks.

A drum 79 is mounted rigidly upon a revoluble stub shaft 80 and is disposed immediately above a spring barrel 81. A cord 82 is partially wound upon the drum 79, this cord being also partially wound upon a spool 88 secured upon a shaft 83. Mounted upon the shaft 83 is a spiral wire 84 serving as a screw thread and rigidly connected at its ends with the shaft 83. A hand crank 85 is mounted upon the upper end of the shaft 83 for the purpose of turning the same at will. Mounted rigidly upon the shaft 83 is a box 83ª, and pivoted upon the latter is a pawl 86 adapted to rock vertically. This pawl is provided upon its upper surface with a leaf spring 87 which engages the spool 88 secured upon the shaft 83. The pawl 86 is provided with a portion 89 projecting downwardly, and disposed partially within the path of this portion are two bosses 90, 91, carried by a slide 92 and rigid in relation to the same. These two bosses serve as limiting stops to prevent the rapid rotation of the pawl 86. The slide 92 is adapted to be actuated within certain limits along the upper end of the bar 60. As shown in Fig. 2, the slide occupies its extreme limit to the right. If, now, the slide be moved slightly to the left, the boss 90 will disengage the portion 89 of the pawl 86, and this pawl under tension of the cord 82, tends to rotate. It makes half a revolution and is stopped by the boss 91 engaging the portion 89. When, therefore, the slide 92 is moved back into its original position indicated in Fig. 2, the pawl 86 makes a second half revolution. Each complete revolution of the shaft 83 and thread 84 is therefore effected, or rather permitted, by a movement of the slide 92, first toward the left and next toward the right, according to Fig. 2. Lugs 93 are mounted upon the portion 61 of the bar 60 and mounted upon these lugs is a pivot pin 94. A lever 95 is supported by this pivot pin and is provided with a portion 96 which extends obliquely upward through a portion 92ª to the slide 92. Whenever the lever 95 is caused to rock, the slide 92 reciprocates and thus allows the gradual rotation of the shaft 83. The pawl 86 and slide 92 with their accompanying parts thus constitute an escapement.

Record disks are shown at 97, 98, 99 and are supported by the different convolutions of the thread 84. The rod 75 extends through all of these disk records. Whenever the lever 95 gives one up stroke and one down stroke, the escapement is operated in such manner that the thread 84 forms one complete revolution and this releases the lowermost record disk which in this instance is the one marked 99. The record disk being released simply follows the rod 75 downwardly, and the upper portion of the shaft 72, and rests upon the turntable. The lever 95 is pivotally connected at its outer end with a rod 100, the latter being in turn pivotally connected with a sliding rod 101. This sliding rod is supported at its upper end by a slotted plate 102 connected rigidly with the upper frame 59 and supported thereby. The shaft 45 is provided with three cams 103, 104, 105. The cams 103 and 105 are so-called "snail cams" (see 105, Fig. 6), while the cam 104 is what we designate as a "roller cam," it being provided with rollers 106, 107. The roller 107 is a little in advance of the roller 106 in the general direction of rotation. All of the cams are for the purpose of actuating different movable parts, as hereinafter described.

A sound box 108 (see Figs. 13, 14, 15) is provided with a needle holder 109, and a needle 110 is secured temporarily within the holder for the purpose of engaging the surface of the disk record. The needle holder is provided with a funnel-shaped opening 111 to facilitate the entrance of the blunt end of the needle. This opening 111 merges into a slot 112, as will be understood from Figs. 14, 15. A lever 113 is provided with a head 114 of the shape shown in Fig. 15, and this head is adapted to engage the blunt end of the needle 110 for the purpose of ejecting the needle from the needle holder. The lever 113 is mounted upon a pivot 115 and is provided with a portion 116 extending outwardly from this pivot. When the portion 116 is moved upward according to the view shown in Fig. 15, the needle 110 is ejected. A guide plate 117 is mounted upon a portion 118 of the sound box and serves to temporarily secure the needle holder in a definite position, as hereinafter explained, for the purpose of facilitating the changing of the needle. A needle bar is shown at 119 and is connected with the needle holder. The needle holder 109 is provided with a revoluble bolt 120 provided with a cross pitch thread 121, and further provided with a smooth cylindrical point 122. The latter engages the needle 110 for the purpose of holding it temporarily in position. A spring 123 is provided with portions 123ª, 123ᵇ, whereby it is secured in position. This spring is wound spirally around the bolt 120 and normally holds it in such position that the point 122 presses against the needle 110 with sufficient firmness to hold it in position. Mounted upon the bolt 120 is a sleeve 124 into which extends a screw 125 engaging the bolt 120. This clamps the sleeve 124 and bolt 120 rigidly together. The sleeve 124 is provided with an arm 126 shaped substantially like a horn, as indicated in Fig. 13. The arm 126 normally engages a limiting stop 127 having the form of a spring hook. Whenever the arm 126 is raised, as indicated by dotted lines in Fig. 13, the bolt 120 (see Fig. 14) is turned, and the needle 110 is dropped. The ends 123ª, 123ᵇ of the spiral spring 123 are secured respectively to the arm 126 and the needle bar 119, as will be understood from Fig. 13. A needle box 110ª for receiving the needles dropped one at a time after using, is mounted upon a bracket 110ᵇ. For this purpose, a plate 110ᶜ is connected with the needle box and is placed flatly against the bracket 110ᵇ, and secured to the same by a screw 110ᵈ. The plate 110ᶜ is also bent slightly over the top of the bracket. By removing the screw 110ᵈ, the needle box may be removed for the purpose of throwing out the needles.

A phonographic tube is shown at 128 and is pivoted at the point 138ª to the braces 129. The tube 128 is free to accommodate itself to different parts of the record, and also to allow the needle holder and its accompanying parts to be shifted for the purpose of changing the needle. The phonographic tube 128 engages a rest 130 and is connected by a flexible coupling 131 with the horn 132. The horn is supported at its larger end by a rest 133 (see Fig. 2) this rest being mounted rigidly upon a rod 134 which is bent at different angles upon itself, as at 135, Fig. 8, and pivoted in bearings 136. These bearings are integral with a plate 137 secured to the framework. By pushing the rest 133 back or forth, the horn 132 can be elevated or lowered within reasonable limits. It is for this purpose that we mount a portion of the rod 135 in bearings 136, as indicated in Fig. 8.

A post 138 is provided with outwardly extending portions 138ª, the post together with these parts being of a general Y-shape. The rest 130 is pivoted intermediate of the portions 138ª of the post. The top of the post 138 is provided with a pivot 139, and its bottom with another pivot 140 (see Fig. 11). A bracket 141 engages the pivot 139 which extends through it, as indicated in Fig. 11. Similarly the pivot 140 extends downwardly into a rod 142 supported rigidly upon the framework. Connected securely with this rod 142 is another rod 143 bent into the shape indicated in Fig. 11. Mounted upon the upper end of this rod is a supporting sleeve 144 constituting a bearing for a small portion of the horn 132. A leaf spring 145 engages the horn 132 and is provided with a portion 146 secured to the rod 143. This portion 146 is bent upwardly at 147 so as to form ears for the purpose of holding the lower end of the spring 145 rigid in relation to the bar 143. A bolt 148 extends through the bar 143 and the spring 146. This bolt is encircled by a spiral spring 149. A nut 150 is threaded and fitted upon the lower end of the bolt 148, the latter being threaded likewise. By turning the nut 150 the spiral spring 149 is compressed or relaxed to a greater or lesser extent, as desired, thus affecting the degree of pressure exerted by the leaf spring 145, serving as a means for controlling the tension of this spring.

A rod 151 is connected rigidly with the post 138, the latter being provided with a lug 152 for the purpose of making the connection between the rod 151 and the post rigid. The rod 151 extends toward the center of the machine (see Fig. 8) and pivotally connected with it is a weight holder 153 of substantially U-shape. A weight 154 is rigidly secured upon this weight holder. This weight is provided with a roller 155 which rests upon a leaf 156 constituting a track therefor. This leaf inclines downwardly so that the weight 154 normally tends to draw the rod 151 toward the lower end of the leaf 156. The leaf 156 may be bent to different angles, as desired, so as to practically adjust the pull exerted by the weight 154. A bracket 157 is mounted rigidly upon the rod 151 and along the rod 151 is moved by the weight 154. A rocking shaft 158 is mounted in bearings 159, 160, these bearings being integral with slides 160ª (see Fig. 8). A portion 161 of the rocking shaft 158 is bent upwardly and forwardly and is located within the path of the bracket 157, so that when the bracket is moved by action of the weight 154 the rocking shaft 158 is turned a little distance. A portion 162 of the rocking shaft 158 extends beyond the bearing 160 and is bent outwardly. A rocking lever 163 is pivotally mounted upon a support 164, the latter being free to turn upon a pivot 165. The lever 163 is provided with a blade 166 of arcuate conformity. This blade normally occupies a position almost coinciding with a part of the path of a boss 167, which is mounted upon the under side of the turntable. The parts are so arranged and adjusted, however, that unless the portion 162 of the rocking shaft 158 is in its uppermost position, the blade 166 is not quite within the path of the boss 167. Our idea is to have the blade 166 raised by action of the rocking shaft 158 into such position that the blade may be struck by the boss 167, owing to the revolution of the turntable. The support 164 is provided with a lug 168 which is adapted to enter the notch 48 of the cam 47. A counterweight 169, adjustable relatively to the lever 163, enables this lever to be so arranged that comparatively little effort exerted by the part 162 of the rocking shaft 158 will raise the blade 166 into the path of the boss 167; see Fig. 7.

A spring 170 is wound upon a lever 170$^a$, and this lever is integral with a shaft 170$^b$, which is journaled in bearings 170$^c$ and free to rock. The lever 170$^a$, acted upon by the spring 170, normally holds the lug 168 in the notch 48 of the cam 47. In doing this the spiral spring tends to force the lever 163 into such position that the blade 166 will intersect the path of the boss 167, but until the cam 47 turns into such position that the lug 168 can enter the notch 48 the lever 163 must occupy the position indicated by dotted lines in Fig. 8. The instant, however, that the lever is free to move (owing to the fact that the lug 168 passes into the notch 48) it springs into the position indicated by full lines in Fig. 8. Even this does not quite enable the boss 167 to trip the lever, for the reason that the blade 166 is too far below the boss. When, however, the rocking shaft 158 is turned, the portion 162 raises the blade 166 directly into the path of the boss 167. The lever 163, it will be understood, has two motions; that is to say, it turns slightly in two planes intersecting each other (Fig. 8). The lever may be turned from the position indicated by dotted lines, to that indicated by full lines, and vice versa, and it may also be rocked so as to raise and lower the blade 166. When in its lowermost position it engages the rest 171. The cams 105 upon the shaft 45 is engaged by a roller 172, this roller being mounted upon a spring bar 173 which is provided with a shelf 174 (see lower right hand portion of Fig. 5). A spiral spring 175 is connected with the shelf 174 and pulls the same directly. A hook 176 formed at the lower end of a bar 177 loosely engages the under side of the spring bar 173 which is bent for this purpose, as will be understood from Fig. 4. The bar 177 is pivotally mounted upon links 178, 179, these links being journaled upon the upper frame 59. A spiral spring 180 is connected with this frame and with the bar 177. This spring tends to normally hold the bar 177 in its highest position, and thus cause it to press gently against the under side of the spring bar 173. The tension of the spring 180, however, is not sufficient to raise the spring bar 173. Mounted upon the bar 177 is a spring finger 181 which extends to the left according to Fig. 4, so as to be approached quite closely by the lever 126. Mounted below the spring finger 181 is a spring rest 182 which is at times engaged by the spring finger 181. A bracket 183 is mounted rigidly upon the upper frame 59 and supports two guide plates 184, 185, which are for the purpose of guiding the sound box 108 when the latter is being moved into position to have the needle changed. Mounted upon the upper frame 59 and depending therefrom is a bracket 186. A rocking shaft 187 extends through this bracket and also directly through a part of the upper frame. This rocking shaft is provided with a portion 188 formed into a crank, as indicated in Fig. 4, and extending partially into the path of the sound box. The rocking shaft 187 is provided at its other end with a crank 189. Journaled upon this crank is a bar 190. A spring 191 is connected with this bar and also with the upper frame 59. A link 192 is pivotally connected with the upper frame and with the bar 190. The bar 190 terminates at its lower end in a hook 193 which extends out under a spring bar 194 provided with a shelf 195. A stout spring 196 is connected with this shelf and normally tends to pull the same downwardly. The spring 191 is considerably weaker than the spring 196 and merely holds the bar 190 up toward the spring bar 194. An adjusting screw 197 extends through the spring bar 194 and also through a thumb nut 198. By loosening the thumb nut the adjusting screw 197 may be raised or lowered and then tightened in position by tightening the thumb nut. In this manner the play of the hook 193, and consequently of the bar 190, may be regulated at will in such manner that the height to which the shelf 195 may be raised can be regulated at will. A roller 199 is mounted upon the spring bar 194 and engages the cam 103, which, as above described, is secured upon the revoluble shaft 45. Pivotally mounted upon the shelf 195 and depending therefrom is a pawl 200 carrying at its lower end a weight 201. Brackets 202, 203 are mounted rigidly upon the upper frame 59, and secured to these brackets is a substantially Z-shaped bar 204. To this Z-shaped bar, ears 205 are rigidly secured, which partially encircle a slide 206. At the lower end of the Z-shaped bar 204 is a slot 204$^a$, through which and into the slide 206, extends a screw 206$^b$; see Fig. 20. A hook 207 is mounted upon the lower end of this slide and spaced therefrom by a spacing block 208. The pawl 200 hangs partially within the path of the hook 207, so that whenever the shelf 195 descends, the pawl 200 engages the hook 207 and pulls the slide obliquely downwardly.

The upper end of the slide 206 carries a head 209 provided with ears 210, 211. Journaled within these ears is a link 212 and mounted within this link is a slide 213 provided with shoes 214 which engage oppositely disposed portions of the link. The lower end of the slide 213 is provided with a plate 215 having a lug 216 integral therewith, this lug being bent slightly upward, according to the view shown in Fig. 4. A pin 217 is mounted rigidly upon this lug and extends obliquely upward through a spiral spring 218, and also through an ear 219 which is rigid upon the head 209. The fit of the pin 217 within the ear 219 is quite loose so that some little play of the pin within the ear is afforded.

A shaft 220 is journaled within the head 209 and is encircled by a spiral spring 221 (see Fig. 20,) which is secured thereto by a pin 221$^a$. The lower end of this shaft is provided with a shoulder 220$^a$ and is journaled in a bracket 220$^b$. A lug 212$^a$ mounted upon the link 212 (see Fig. 21) is adapted to engage the shoulder 220$^a$. The upper end of the shaft 220 is provided with a reduced threaded portion 222 upon which fits a nut 223. This shaft 220 extends through metal disks 224, 225, a rubber disk 226 and another metal disk 227 arranged as shown in Fig. 20. Holes 228 extend through the disks 226 and 227 and into the disk 225, which is coned out to receive the sharp end of the needle. Into the holes 228 are inserted a number of needles 110, spaced equidistant. As each needle is thus centered in the bottom of the hole in which it rests and is also centered by the rubber disk 226 because of the resiliency of the latter, the needle is held straight, but is not rigid while in the needle wheel. The disks 224, 225, 226 and 227 together constitute a member which we designate as the needle wheel. A stop pin 229 is mounted rigidly upon the needle wheel.

A needle chute 230 is provided with a plate 231 integral with it (see Fig. 21) and this plate is adjustably connected by a screw 232 and a nut 233 with the head 209. A washer 234 is disposed immediately below the needle wheel. A plate 235, adjustable by aid of a bolt 235$^a$ and nut 235$^b$, is provided with an upwardly projecting portion 236 having a slot 237. This plate with its slot is for the purpose of guiding the sound box. For this purpose the plate 235 may at times be raised into such position that the plate 117 upon the sound box may be disposed within the slot, as will be understood from Fig. 4.

In order to facilitate the exchange of the needles from the needle wheel to the needle holder, they are brought in succession to the determinate point by aid of a V-shaped mutilation 238 (see Fig. 7) in the needle chute. The needle wheel can only turn to such an extent as will bring one of the needles into the bottom of this V-shaped mutilation, and when this needle is pulled out, the needle wheel is free to turn slightly so as to bring the next successive needle into the same position.

Mounted upon one end of the shaft 45 is a crank 239. Journaled upon the other end of this crank is a pitman 240, the lower end of this pitman extending downwardly and being journaled upon a bracket 241 carried by a slide 242. This slide also carries another bracket 243 and extending through both of these brackets is a slide rod 244. This slide rod is slidably mounted near its lower end in a bearing 245. The upper end of the slide rod is connected rigidly with a plate 246 having a central slot 246$^a$ and being slidably mounted in bearings 247. Mounted upon the upper end of the plate 246 is a bracket 248 extending horizontally therefrom. A horizontal arm 249 is mounted upon this bracket and is provided with a slot 250. Extending obliquely upward through this slot is a movable arm 251 which is mounted upon a pivot pin 252 secured rigidly upon the lower portion of the bracket 248. The arm 251 is free to swing within limits allowed by the slot 250. A plate 253 is mounted upon the horizontal arm 249 and is provided with a slot 254, and a screw 255 extends through this slot and into the horizontal arm 249. By aid of the screw 255 and slot 254 the plate 253 may be adjusted within reasonable limits upon the horizontal arm 249. The plate 253 is provided with a lug 256 integral therewith, and this lug is engaged by a pawl 257, which pawl is mounted upon a pivot pin 258 carried by the plate 253. A spring 259 is wound partially around the pin 258 and is secured rigidly thereto, this spring being also secured to the pawl 257, as will be understood from Fig. 9. The upward limit of movement of the pawl 257 is made by the lug 256. The pawl is thus free to swing downwardly upon the pivot pin 258 as a center, until the pawl reaches such position that its upper surface is flush with the upper surface of the arm 249. Mounted upon the slide rod 244 is a bracket 260 secured rigidly in position by a bolt 261, and by aid of this bolt the bracket 260 may be adjusted upon the rod 244. A pawl 262 is pivotally mounted upon the bracket 260 and is connected therewith by a spring 263 in such manner that the upper portion of the pawl 262 normally stands vertical. This pawl is mounted upon a pivot 264 and is provided with a lug 265. Disposed adjacent to the path of this lug is a slide 266 provided with a slot 267. An adjusting screw 268 extends through this slot and into the frame member 25. The lower end of the plate 266 is provided with a lug 269, this lug being directly in the path of the lug 265 of the pawl 262.

The rotation of the shaft 45 causes the crank 239 to turn, and the pitman 240 actuated by this crank causes the slide rod 244 to reciprocate vertically. The slot 246ª in the plate 246 is not of sufficient length, however, to allow the rod 244 to perform a stroke of double the length of the crank 239; that is to say, the rod 244 and the plate 246 move upwardly until stopped by the engagement of the lower end of the slot 246ª against the shaft 45. At the instant when this takes place the lug 265 lodges against the lug 269 (see lower left-hand portion of Fig. 9), and the pawl 262 is tripped. This pawl in the lower portion of the stroke of the rod 244 engages a lug 241ª upon the plate 241. When, however, the pawl is tripped, as just stated (see Fig. 9), it disengages the lug 241ª, and the slide 242 being now free of the rod 244, simply continues its upward travel in consequence of motion given it by the crank 239.

The movement just described may be briefly summarized by saying that the slide 242 has the motion which would ordinarily be expected from the crank 239, and during a part of the stroke of this slide it carries with it the rod 244, dropping this rod at a definite point and picking it up again upon the down stroke of the rod 244. This picking up of the rod 244 by the downward movement of the slide 242, takes place because the instant the slide 242 reaches the bracket 260 and carries it downward, the portion 265 of the pawl 262 is released from the stationary bracket 269, and the pawl 262, under impulse of the spring 263, clicks again into its normal position, thus engaging the lug 241ª of the plate 241 and causing the slide 242 and the rod 244 to finish, as a unit, the down stroke given by the crank 239.

Disposed adjacent to the slide rod 244 and parallel therewith is another slide rod 270, the latter toward its bottom extending through a bearing 271 and being provided with a toe 272. A spiral spring 273 of the so-called "extension type" is connected with the toe 272 and is also secured to an ear 274 mounted upon the framework. The slide rod 270 is provided with a wide flat portion 270ª which enables it to be more easily guided. This slide rod 270 has a motion very much like that of the slide rod 244. It starts upward at the same instant as the slide rod 244 and when the latter is stopped as above described, the slide rod 270 is stopped at the same instant. Hence, the horizontal arm 249, which is supported partly by the plate 246 and partly by the slide rod 270, has an analogous motion. It moves upward at the same instant as the rod 244.

A pitman rod 100ª, which is pivotally connected with the slide 242, is provided with a sliding head 100ᵇ, in which is mounted a spiral compression spring 100ᶜ, the latter being always under more or less tension, and being compressed whenever the swinging arm 251 is in its extreme position at the left, according to Fig. 9, so as to firmly hold the phonographic tube 128 while the sound box receives a needle. The upper end of the sliding head 100ᵇ is pivoted at its upper end to the arm 251. Since the slide 242 has a movement equal to double the length of the crank 239, it follows that the rod 100ª and the arm 251 actuated by it do not stop in their movements except at the limits of the stroke of the crank. The net result is that when the horizontal arm 249 is in its lowermost position, the arm 251 occupies its farthest position to the right, according to Fig. 3. The horizontal arm 249 and the arm 251 start upwardly together, still occupying the same relative position. The arm 249 comes to a stop; yet the arm 251 does not stop but continues its upward motion now swinging upon the pivot pin 252 as a center, ultimately reaching its extreme position to the left, as indicated in Fig. 9. This operation also brings the sound box from the center of the record into a position favorable for setting the needle. Furthermore, the action just described causes the needle to move into suitable position to engage the record at the starting point thereof. This movement is repeated with every revolution of the shaft 45.

The crank 239 carries a pin 275 extending inwardly toward the framework, as indicated at the left of Fig. 5. This pin is in close proximity to a star wheel 276 which is mounted upon a stub shaft 277. This star wheel is provided with pawls 278 mounted one upon every second tooth by aid of a screw 279ª, as indicated in Fig. 9. Partially obstructing the path of each pawl 278 is a lever 279 mounted in brackets 280. The lever 279 is integral with a shaft 281, the other end of this shaft being provided with a crank 282 integral with it. Each time the lever 279 is thrown outward the crank 282 rises and moves slightly outward from the center of the machine.

A bracket 283 (see lower right-hand corner of Fig. 4) is adjustably mounted, and for this purpose a screw 284 passes directly through it. By loosening the screw 284 and moving the bracket endwise, as indicated by full and dotted lines in Fig. 4, the arm 279 may be moved into or out of the path of the several pawls 278. The purpose of this arrangement is to enable the operator, by adjusting the bracket 283, to enable the step-by-step rotation of the star wheel 276 to stop the action of certain parts, as hereinafter described. The rotation of the star wheel is accomplished step by step. Each time the shaft 45 makes a complete revolution, the star wheel is turned one step.

Referring now to Fig. 5, lower central portion, a bracket 285, of substantially U-shape, is mounted rigidly upon the upper frame 59 and supports a pin 286 extending directly through it. Journaled upon this pin by means of bearings 287, 288 are two levers 289, 290, which are engaged respectively by the rollers 107, 106 carried by the roller cam 104. Each time the shaft 45 turns, these two levers are lifted upward, the movement of the lever 289 being slightly earlier than that of the lever 290. Each time the shaft 45 makes a revolution, therefore, a roller 291, carried by the lever 290, being normally in contact with the plate 215 of the slide 213 (see lower middle portion of Fig. 4), and being raised by the under side of the roller 106 against the under side of the lever 290, causes the slide 213 to move obliquely upward according to the view shown in Fig. 4. As the spring 218 will resist considerable pressure before being compressed to any great extent, the slide 206 is raised obliquely upward, carrying ahead of it the needle wheel. The latter stops in such position that one of the needles is inserted directly into the needle holder which at this step is always empty. The lever 289 engages the under side of a portion 293 of a link 292, thus raising this link. In the meantime the cam 105 raises the shelf 174 so that the portion of the link underneath this shelf is entirely clear of the same for the moment. As the shelf 174 is raised by the action of the cam 105 against the roller 172, the rod 177 moves upward in consequence of the constant pull of the spring 180 upon it. The shelf 174 reaches approximately its highest position before the lever 289 begins to rise, as will be understood from Fig. 4. The shelf pauses for a moment in its highest position and is overtaken by the horizontal portion 294 of the link 292 which rises into engagement with it. For convenience the link is provided with the double portion 293 of sufficient breadth to constitute a broad bearing for the lever 289. The shelf, being released by the rotation of the cam, is drawn abruptly downward by the tension of the spring 175 and carries with it the link 292 and all parts immediately dependent upon this link for their motion. The slide rod 101 being connected with this link is thus given a reciprocating vertical motion which, like the rotation of the shaft 45, is by no means constant. Connected with the link 292 is a spiral spring 292$^a$ which retracts it into normal position whenever it is otherwise free.

The lower end of the slide rod 101 is integral with a plate 296 provided with a slot 297, as shown in Fig. 10. The slide rod 101 is slidably connected to bracket 110$^b$. For this purpose a bolt extends through the slot 297 and into bracket 110$^b$. Said bracket is rigidly mounted upon a frame 59 and holds the needle box 110$^a$ integral with a plate 110$^c$ by a screw 110$^d$ (see Fig. 4). The plate 296 is further provided with an extension 295 bent substantially into U-shape as indicated in Fig. 10. A lever 299 is mounted upon the rod 101 by aid of a pivot pin 300. The plate 296 is provided with a lug 301 which normally engages the upper surface of the lever 299 and thus constitutes a limiting stop for the lever. Mounted upon the plate 296 is a guide plate 302 inclined slightly as indicated in Fig. 10, and having a portion 303 secured to the rod 101. A spiral spring 298 connects together the lever 304 and the U-shaped lower end of the slide rod 101, for the purpose of normally holding the lever 304 at one limit of its movement, indicated in Fig. 6. A substantially U-shaped lever 305 is journaled within the bearing 306. A portion 307 of this lever extends upwardly from the bearing and engages the slide 213 at the inner side thereof so that whenever the lever 305 is moved outwardly, the slide 213 and its immediate mountings likewise swing outwardly, being journaled in the brackets 210 as above described, for this purpose (see lower central portion of Fig. 4).

By adjusting the bracket 283 (see lower right-hand portions of Fig. 4) as indicated by dotted lines, and the lever 279 being moved into the path of the pawls 278, it follows that each partial revolution of the star wheel 276 in causing one of the pawls to move the lever 279 outwardly, must necessarily cause the crank 282 carried by the shaft 281 to engage the inner surface of the U-shaped lever 305 so as to throw this lever outwardly. In doing this the slide 213 and link 212 swing outwardly as described, so that when the roller 291 rises, as above described, the slide 213 is not lifted and consequently the needle wheel is not moved upward. It follows, therefore, that the operator, by merely adjusting the bracket 283, causes the needle wheel to be periodically moved upward or to remain stationary, as desired. At the instant when the slide 213 is pulled outward, the link 292 is likewise pulled outward; this is done by the U-shaped rod 305. Hence, the upward movement of the plunger rod 101, with its dependent parts, is prevented. As a consequence, the needle is not ejected, and no record now drops upon the turntable. The needle wheel, the needle ejector and the record-dropping apparatus are disengaged for the time being from control of the shaft 45. The result is that each record is played twice in succession with one needle before the next successive record is allowed to drop upon the turntable. This will be easily understood by bearing in mind the action of the pawls 278, located one each upon every second tooth of the star wheel 276.

A spacing sleeve 307$^a$ encircles the bolt 277 of the star wheel 276 (see lower right-hand portion of Fig. 24). A bracket 308 partially supports this sleeve and also supports one end of the bolt 277. Spring washers 309 and a nut 310 are used for the purpose of loosening and tightening the star wheel 276 in order to render it easy to turn, and yet prevent it from turning too easily. A guide rod 311 (see upper portion of Fig. 3) is secured upon the framework and is used to guide the phonographic tube 128 into proper position to enable the needle to start on the record. The guide rod 311 is secured upon the framework by a clamping bracket 311$^a$, secured in position by aid of a screw 311$^b$.

In Fig. 24 the upper frame is shown at 312 and is substantially U-shaped, being provided at its top with a plate 313. A bracket 314 of substantially U-shape is mounted centrally within the upper frame, and a stub shaft 315 is supported by this bracket. Mounted rigidly upon this stub shaft is a lever 317. A roller 318 is mounted upon a cam 316, the latter being secured rigidly upon the shaft 45. This cam takes the place of the cam 104 shown in most of the other figures, for instance Fig. 7. The lever 317 is partly cut away, as indicated in Fig. 24, and is tripped one time for each revolution of the cam 316 and shaft 45. Mounted upon one side of the upper frame 312 is a bracket 319 which supports a guide rod 320. This guide rod is for the purpose of guiding the phonographic tube 128 into the position indicated in Fig. 4. The slide rod 321 extends through a guide plate 322, the latter being rigid upon the plate 313. The lower portion of the rod 321 is bent into the form of a hook 323 and supported upon the rod 321 is the link 292 having the form and office above described. A bracket 324 forms a slidable support for the lower end of the rod 321. A pin 325 extends through the lower end of the rod 321, which is slotted for the purpose, into the bracket 324. It will be noted that the form shown in Fig. 24, has no needle wheel. It is made, therefore, for so-called permanent needles only, or at least is intended to be so used that one needle is employed for playing a number of records. The phonographic tube 128 moves upward from the turntable as in the other form of machine above described, but in the form shown in Fig. 24 this is merely for the purpose of allowing the record to be changed. In all other respects the action of the mechanism shown in Fig. 24 is the same as that shown in the other figures.

The operation of the mechanism shown in Figs. 1 to 23 inclusive, is as follows: We will suppose that the rod 75 has been removed and that no records are in the machine. The operator lays a disk record upon the turntable 70. He next swings the bracket 65 (see Fig. 2) outwardly, which is easily done, the bracket being pivoted upon the pin 67. The operator next adjusts the bracket 62 according to the size of record to be played. He next places the edge of a record disk 97 upon the brackets 62 and 65, and inserts the opposite edge of this disk into the lowermost thread made by the spiral spring 84. Then, by turning the hand crank 85 this record is carried upward a single turn by the thread. The operator now inserts a second record below the first, supporting one of its edges upon the brackets 62 and 65 and lodging its opposite edge against the lowermost turn of the spiral wire 84. He next turns the hand crank 85 another single turn, and this secures the record disk in position. If the record disks are small, they may be adjusted as follows: The record holder bar 60, carrying its dependent parts, is placed about an inch back on the brace 58, at hole 60$^c$, and on the frame 59 at the hole 60$^d$. Bracket 62 is now replaced at the hole 60$^a$. The small records are now loaded into the machine, in the same manner as larger ones. A record guide rod, bent somewhat differently on top than the guide rod 75, is inserted at the hole 60$^b$ and upon boss 74. The guide rod 311 must also be adjusted to guide the phonographic tube 128 and the sound box farther upon the turntable so as to enable the sound box and needle to start on the small record. The plate 253 must also be adjusted on the horizontal arm 249, so as to accommodate itself to this arrangement. The record magazine may also be loaded as follows: Wind up the spring barrel 81 as above described, slide the edge of the first record disk on brackets 62 and 65 and slide the opposite edge of the record disk into the lowermost thread of the spiral 84. Now slide the second record disk upon the first record, and into the second thread of the spiral. Next follows the third record disk in the third thread, and so on until there are as many record disks in the magazine as there are threads in the spiral 84. By so loading, each record is slid in place from one side, and the guide rod 75 is inserted through the centers of the records and on the boss 74 of the turntable shaft. A number of disks, commensurate with the number of turns of the spiral wire 84, are thus inserted, each disk representing one complete revolution of the hand crank 85. As the hand crank is thus turned in inserting the record disks, the spring barrel 81 is gradually wound up, being completely wound when the maximum number of record disks are inserted. The operator next takes the rod 75 and inserts it as indicated in Fig. 2, bringing its lower end 76 into proper registry with the boss 74 and causing the upper end 77 of the rod to click into the spring clip 78. The bracket 65 is now swung back into the position indicated in Fig. 2. The several disk records are now housed in the upper part of the machine which we designate as the magazine. The operator next fills the needle wheel with needles, inserting them one at a time, as will be understood from Figs. 7 and 20. To do this he first turns the wheel in a contra clockwise direction, according to Fig. 7, until the boss 229 engages the edge of the needle chute 230. The spiral spring 221 being always under tension, tends to turn the needle wheel backward or in a clockwise direction, according to Fig. 7. Holding the wheel under tension, the operator, by hand, places in it all of the needles 110 which it is capable of holding, one of these needles, of course, extending through the mutilation 238 and preventing, for the moment, any rotation of the needle wheel. The operator next grasps the hand crank 30 and by its aid turns the shaft 29, so as to wind the spring 42. Motion is thus transmitted through the gearing to the shaft 45 and the latter tends always to turn, but is normally restrained.

It will be understood that the motion of the turntable carrying one or more disks is entirely independent of any of the spring mechanism or gearing above described. The turntable is actuated from the pulley 73 (see Fig. 2) and turns constantly, its rotation being independent of any spring mechanism elsewhere described.

In order to start the machine in the first instance, the operator may raise the blade 166 by depressing the opposite end of the lever 163. This brings the blade 166 into the path of the boss 167 carried upon the lower face of the turntable, and as the turntable is rotating, the boss 167 moves the blade 166 in a clockwise direction, as indicated in Fig. 8. This causes the pawl 168 to be withdrawn from the cam 47 and allows the shaft 45 to make one revolution upon the impulse of the gearing. The shaft 45 usually makes but one turn, being stopped by the pawl 168 clicking into the notch 48 of the cam 47. This single turn of the shaft 45, however, represents the complete cycle of operations as above described. The cam 103 upon the shaft 45 lifts the shelf 195 and allows the rod 190, under impulse of the spring 191, to move upward. In doing this the shaft 187 is rocked, and the crank 188, being now restrained by nothing but the spring 191, is free to swing from its normal position. This is to allow the sound box 108 to be brought into a position favorable for discharging the old needle and receiving a new one. The cam 105 in turning lifts the shelf 174 and raises the spring 180. This raises the spring arm 181 in order to make room for the entrance below it of the lever 126, as will be understood from Fig. 4. The cam 104 being rotated causes the roller 107 to lift the lever 289. This raises the link 292 and the rod 101. In doing this the lever 299 (see Fig. 10) is brought into engagement with the portion 116 of the lever 113, (see Fig. 15) and this causes the ejection of the needle 110, which rolls down the needle chute and into the needle box 110ª. The same upward movement of the rod 101 causes the guide plate 302 to engage the under side of the lever 126, moving it into the position indicated by dotted lines in Fig. 13. This unscrews the needle 110 and thus loosens it at practically the same instant that the ejector lever 116 is thrown into action. The needle already in the needle holder is thus loosened and thrown out.

The fact that the roller 107 is slightly in advance of the roller 106 (see Fig. 4) causes the action of the roller 106 upon the lever 290 and roller 291 to be retarded slightly. The act of ejecting the old needle from the needle holder is complete before the roller 291 rises. As the roller 291 rises, the slide 213 moves obliquely upward to the right, according to Fig. 4, and the needle wheel moves in the same direction. The first needle 110 of the series contained in the needle wheel is now in exact alinement with the needle holder, which is now empty and open, as just described. The oblique movement of the needle wheel upward to the right, forces the stub end of the needle into the needle holder. The instant the needle holder thus receives the stub of a new needle, the rod 101 descends suddenly, owing ultimately to the action of the cam 105 releasing the shelf 174. This causes the spring arm 181 to turn, and this action secures a new needle firmly in position. The release of the shelf 195 from the cam 103 allows the shelf to drop abruptly, and as the latter does so, being forced downward by the spring 196, it pulls the rod 190 downward, thus rocking the shaft 187 and causing the crank 188 to eject the sound box from the position it has momentarily occupied while receiving this new needle. The sound box being thus ejected, its weight together with that of the tube 128 causes the tube to slide obliquely downward, being guided by the rod 311. At the same instant the horizontal bar 249 descends owing ultimately to the action of the crank 239, as elsewhere described. The swinging arm 251 is now relaxed and as the horizontal rod 249 descends, the phonographic tube 128 is carried gently downward in an oblique direction and landed near the outer edge of the record disk resting upon the turntable. As this disk is constantly rotating, the instant it is engaged by the new needle, the phonographic sounds are reproduced. The sound box and phonographic tube connected with it are gradually carried toward the center of the disk, this action being due to the thread-like conformity of the record groove. When the sound box thus moves obliquely downward, the needle engages the record disk near the outer edge of the same, the part of the disk thus engaged being smooth. The weight 154 now tends to so move the sound box and parts connected with it as to lead the needle point into the beginning of the sound groove. The weight 154 does not pull so hard, however, as to cause the needle to skip out of the sound groove. As the leaf 156 may be inclined (by bending) to any desired extent, the degree of its pull may be regulated at will so that any tendency of the needle to behave improperly may be corrected. The record being completed, the sound box occupies such position that the needle now rests upon the central smooth portion of the record. In this position, however, (the sound box being comparatively near the center of the record) the weight 154 (see Fig. 8) is pulling the tube 128 pretty strongly, tending all the while to move it further toward the position indicated by dotted lines in this figure. Hence, the bracket 157 engages the portion 161 of the rocking shaft 158 and turns this shaft slightly. The other end 162 of this shaft is thus raised against the under side of the blade 166, raising this blade into the path of the boss 167. The lever 163 is thus turned slightly, as indicated by dotted lines in Fig. 8, and the pawl 168 is thus released from the cam 47, allowing the shaft 45 and its accompanying parts to make a second revolution.

During the operation just described, it will be noted that the rod 101 has moved first upward and then downward. In doing this it necessarily raises and lowers the rod 100 and this causes the slide 92 to reciprocate a complete cycle. This according to Fig. 18, means that the slide 92 moves first obliquely downward to the left and then obliquely upward to the right, stopping where it started. In doing this the tooth 91 is disengaged from the pawl 89 and the latter turns half a revolution, being stopped by the tooth 90, and this too is next disengaged, allowing the pawl 86 to perform a second half revolution. Hence the spring 84, which, as above explained, is virtually a thread, lowers each and all of the record disks it contains by a distance representing one thread, the lowermost of the disks being discharged. It glides obliquely downward, covering the disk already upon the turntable. This movement takes place at the instant when the sound box is out of the way; or in other words, while the needle is being changed. The operation of the device is thus continuous and automatic.

When the operator desires to reproduce each record twice, he does so by simply adjusting the bracket 283 (see lower right-hand portion of Fig. 4) as above described. Again, if the operator desires to repeat each record a number of times, he can simply disconnect the rod 100 from the rod 101 and in this event the mechanism containing the disk records now in use, remains unchanged until the rod is connected again.

In using the form of upper frame shown in Fig. 24, each record may be reproduced twice before the next succeeding record drops upon the turntable. In this form of the machine there is no needle wheel, for the reason that the needles are changed by hand as often as desired.

Having thus described our invention, we claim as new and desire to secure by Letters Patent:

1. The combination of a frame, a bracket mounted thereupon and adapted to engage record disks, a turntable disposed adjacent to said frame and adapted to receive said record disks one at a time, a revoluble member provided with a thread mounted upon said frame and disposed opposite said bracket, and means for guiding said record disks to said turntable when disengaged from said thread.

2. The combination of a turntable, a frame mounted thereover, a revoluble member mounted upon said frame and provided with a thread for disengaging the edges of record disks, spring mechanism for turning said revoluble member, and an escapement for periodically stopping said revoluble member.

3. The combination of a needle holder, ejecting mechanism connected therewith for ejecting a needle which has been used, a needle wheel disposed adjacent to said ejector and adapted to contain a number of new needles, means for moving said needle wheel toward said needle holder, and means for tightening a needle when removed from said needle wheel to said needle holder.

4. The combination of a revoluble shaft, gearing for turning the same, a cam mounted upon said shaft, a needle wheel disposed adjacent to said shaft, connections from said cam to said needle wheel for moving said needle wheel bodily whenever said shaft is rotated, a sound box provided with a needle holder, mechanism for moving said sound box so that said needle holder occupies a predetermined position relatively to the general position of said needle wheel, and means for clamping said needle within said needle holder when received from said needle wheel.

5. The combination of a plurality of sound records, means for actuating the same, a needle holder, means for changing the needle in said needle holder, and means controllable by hand for enabling each record to be reproduced a plurality of times before said needle is thus changed.

6. The combination of a revoluble member for supporting a sound record, a magazine for holding a plurality of sound records to be fed one at a time to said revoluble member, means for disengaging said sound records one at a time, and mechanism controllable at will for gaging the sizes of records to be accommodated by said magazine.

7. The combination of a revoluble member for supporting a sound record, a magazine for holding a plurality of sound records, means for feeding said sound records one at a time from said magazine, means adjustable at will for enabling any record to be played twice in succession before another record is fed from said magazine, a needle holder, and mechanism for automatically substituting a new needle in said needle holder after each record is played twice in succession.

8. The combination of a revoluble member for supporting a sound record, a magazine for holding a plurality of sound records, means for feeding said sound records one at a time from said magazine, means adjustable at will for enabling each record to be played twice in succession before another record is fed from said magazine, a needle holder, and means for securing a single needle therein for the purpose of playing a number of records therewith twice in succession.

9. The combination of a revoluble member for supporting a sound record, a magazine for holding a plurality of sound records, means for feeding said sound records one at a time from said magazine, mechanism for causing each record to be played twice in succession before another record is fed from said magazine, a needle holder, and means for shifting said needle holder from one record to another after playing the record twice.

10. The combination of a revoluble member for supporting a sound record, a magazine for holding a plurality of sound records, means for playing said sound records, and mechanism for feeding said sound records one at a time from said magazine, each record being fed after the preceding record has been played twice only in succession.

11. The combination of a revoluble member for supporting a sound record, a magazine for holding a plurality of sound records, means for feeding said sound records one at a time from said magazine, a needle holder, means adjustable at will for enabling any record to be repeated as many times as desired, and automatic mechanism for substituting a needle after each time a record is played.

12. The combination of a revoluble member for supporting a sound record, a magazine for holding a plurality of sound records, means for feeding said sound records one at a time from said magazine, a needle holder for engaging said sound records, and means controllable at will for adjusting said magazine to accommodate large or small records as desired.

13. The combination of a turn-table for holding a record, means for actuating said turn-table, a magazine disposed adjacent to said turntable and adapted to hold a supply of records, a rod disposed centrally of said magazine and extending through the records stored therein, said rod extending toward the center of said turntable for the purpose of guiding said records while traveling from said magazine toward said turntable, and means for disengaging said records from said magazine.

14. The combination of a turntable adapted to support a record while the latter is being played, a magazine for holding records to be deposited upon said turntable, said magazine including a rod for extending through said records in order to guide the same relatively to said turntable, mechanism for engaging the edges of said records while supporting the same independently of said turntable, and co-acting with said turntable for disengaging said member from said edges in order to permit said records to drop upon said turntable.

15. The combination of a needle holder, ejecting mechanism connected therewith for ejecting a needle which has been used, a needle wheel disposed adjacent to said ejector and adapted to contain a number of new needles, means for moving said needle wheel toward and from said needle holder, means for tightening a needle when removed from said needle wheel to said needle holder, a revoluble member for supporting a record, and means co-acting with the movements of said needle wheel for periodically supplying records to said revoluble member.

16. The combination of a revoluble member for supporting sound records, a magazine for holding a plurality of sound records, means for feeding said sound records from said magazine, and mechanism controllable at will for enabling any record to be played a predetermined number of times in succession before another record is fed from said magazine.

17. The combination of a revoluble member for supporting a sound record, a magazine for holding a plurality of sound records, means for feeding said sound records one at a time from said magazine, mechanism adjustable at will for enabling each record to be played a predetermined number of times only before another record is fed from said magazine.

18. The combination of a revoluble member for supporting a sound record, a magazine for holding a plurality of sound records, means for feeding said sound records from said magazine, mechanism adjustable at will for enabling each record to be played a predetermined number of times in succession before another record is fed from said magazine, a needle holder, and means for securing a single needle therein for the purpose of playing each record its predetermined number of times.

19. The combination of a revoluble member for supporting a sound record, a magazine for holding a plurality of sound records, means for feeding said sound records, one at a time, from said magazine, mechanism adjustable at will for automatically causing each record to be played a predetermined number of times in succession before another record is fed from said magazine, a needle holder, and means for shifting said needle holder from one record to another after playing the record said predetermined number of times in succession.

20. The combination of a revoluble member for supporting a sound record, a magazine for holding a plurality of sound records, means for playing said sound records, and mechanism for feeding said sound records, one at a time, from said magazine, each record being fed after the preceding record has played a predetermined number of times only in succession.

21. The combination of a revoluble member for supporting a sound record, a magazine for holding a plurality of sound records, means for feeding said sound records, one at a time, from said magazine, and means controllable at will for adjusting said magazine to accommodate large or small records as desired.

In testimony whereof we have signed our names to this specification in the presence of two subscribing witnesses.

CHARLES E. KRUEGER.
WILLIAM H. KRUEGER.

Witnesses:
WM. HOSCHEID,
O. O. ALLEN.